United States Patent [19]

Irwin

[11] 4,122,711
[45] Oct. 31, 1978

[54] DRAG FORCE KNOTMETER

[76] Inventor: Howard D. Irwin, 718 Ambleside Dr., Wilmington, Del. 19808

[21] Appl. No.: 865,532

[22] Filed: Dec. 29, 1977

[51] Int. Cl.$^2$ ............................................. G01C 21/10
[52] U.S. Cl. ..................................................... 73/184
[58] Field of Search .................................. 73/184, 185

[56] References Cited

U.S. PATENT DOCUMENTS 168,432 10/1875 Trenchard ............................ 73/184

Primary Examiner—Donald O. Woodiel
Attorney, Agent, or Firm—Abramo & Abramo

[57] ABSTRACT

A drag force knotmeter for indicating the speed of a boat in water, especially in the range of 1-12 knots is a device attached to the boat by a flexible line and trails an elastomeric line attached to a drag. The drag is a rigid rod having an eye on one end and a circular disk on the other end. Said circular disk being attached to the rod by its center. The drag is heavier-than-water and is attached to the elastomeric line through its eye. System friction is minimized by maintaining an overall straight line configuration from the drag to the point of attachment to the boat. The elastomeric line isolates sudden surges on the drag from the indicator on the knotmeter.

5 Claims, 3 Drawing Figures

DRAG FORCE KNOTMETER

BACKGROUND OF THE INVENTION

1. Field of the Invention

This invention relates to speed indicators and more particularly to a device for measuring the rate of travel of a marine craft through water. The device is especially adapted for measuring the rate of speed of a sail boat in water.

2. Description of the Prior Art

Devices for measuring the speed of marine craft have been in existence for a long time. In U.S. Pat. No. 168,432, issued to S. D. Trenchard in Oct., 1875, a device is described in which a spring encased in a cylindrical structure is attached to a drag which is pulled through the water. The drag resists being pulled through the water and thereby compresses the spring which is reflected on the scale alongside the long axis of the cylindrical structure. During compression, the spring will rub along the inside of the cylinder. This friction will affect the accuracy of the readings. The device is attached to a boat railing or other solid structure on the boat in a way which allows it to pivot in a holder in order to maintain the alignment of the two with the drag behind it. The device can only rotate in two directions and thereby it is not entirely free to align the tube with the drag to obtain the maximum responsiveness.

Another device was patented in U.S. Pat. No. 290,840, to B. E. Blakeslee, in Dec. 1883. That device was fixed to the railing of the rear of a boat and, because of the way it is anchored to the railing, there is an angle on the line holding the drag and the indicating device such that the lines of force are not aligned with the instrument itself to obtain the most efficient, accurate reading.

In U.S. Pat. No. 2,081,557, issued to R. H. Pierce, et al, in May, 1937, a rather complex device is shown which suffers in addition to its complexity from the same defect as the Trenchard patent in that it is attached to the ship by a hinged swivel which only allows rotation in two directions and thereby decreases the opportunity for the drag and the instrument to maintain its alignment.

There are a number of devices which act to measure the angle at which a weight will rest at equilibrium when it is being pulled through water by the boat. Thus, the amount of deviation from the vertical as reflected by the deflection of a line carrying a weight can be an indication of the speed of the boat. The operating principle of these devices is different than the ones previously mentioned and the one described by the applicant herein. These devices are claimed in U.S. Pat. No. 2,707,878, to W. E. Cameron, et al, in May, 1955, U.S. Pat. No. 2,152,768, to D. M. Myers, in April, 1939, and U.S. Pat. No. 3,089,335, to E. A. Ebert, in May, 1963.

A number of other patents also depend on trolling a device for the measurement of speed of a boat. However, in each of these devices friction points are present because the line from the drag to the instrument is not a straight line due to its manipulation over or around bends. This deflection from the straight-line path between the drag and the indicating device leads to error because of friction generated at each point. Patents embodying this problem are U.S. Pat. No. 477,284, issued to J. J. Townsend, in June, 1892, U.S. Pat. No. 3,706,223, issued to H. R. Dickens, in December, 1972, and U.S. Pat. No. 3,901,076, issued to R. E. Grayson, in August, 1975.

Other complex devices are known which require through-the-hull fitting and thereby greatly increase the overall cost of such devices.

Mainly, the prior art devices are deficient because the line from the drag passes over points of friction before the force pulling on the line is measured which interferes with the accuracy of readings. Pulleys and other devices can be incorporated into a device but at the expense of making it more complex and expensive.

The prior art devices also fail to disclose a stable design for the drag.

SUMMARY OF THE INVENTION

It is the object of the present invention to provide a simple, inexpensive drag force knotmeter which is continuous reading, does not require through-the-hull fitting, has a reasonably high signal to the noise ratio, and does not require permanent mounting or an outside power source.

The objects of this invention are attained by the overall cooperation of a drag, an elastomeric line, a knotmeter, and a flexible line.

These and other objects are achieved according to the present invention by providing a drag force knotmeter, which is suspended from the boat by a flexible line so that the knotmeter is free to move in all directions in order to attain the best alignment possible between the knotmeter, an elastomeric line with one end attached to the knotmeter and the other end attached to a drag having a disk on the end of a stiff rod. In use, the overall configuration of the entire apparatus from the point of attachment on the boat to the end of the drag is substantially a straight line. The knotmeter itself is of simple design embodying a tension spring having one end anchored in a cylinder. Said spring being attached to and responsive to an elastomeric line. The spring lengthens in response to the pull of a drag. The spring also carries an indicating device to show the amount the spring has moved in response to the pull of the elastomeric line.

The elastomeric line is attached to the lower end of the spring. The pull of the elastomeric line is generated by the force exerted when the drag is pulled through the water.

The drag is a circular disk attached through its center to a stiff rod which in turn is attached to the elastomeric line. The drag is heavier-than-water.

This device is especially designed to operate in the range of one to twelve knots. The elastomeric line stretches and shortens during the operation of the device in such a way as to minimize the effect on the instrument reading of sudden surges in the drag force caused by random currents or movement of the boat. In another embodiment, the spring is encased in a cylinder whose outer diameter corresponds very closely to the inner diameter of the outer cylinder. Such rapid movement of the indicator due to rapid changes in the drag force is resisted by the generation of pressure or a partial vacuum inside the knotmeter. Stated otherwise, the differential air pressure between the outside and the inside cylinder is such that rapid oscillation of the spring is prevented thereby smoothing out the readings available from the device.

DESCRIPTION OF THE PREFERRED EMBODIMENTS

Figure 1:
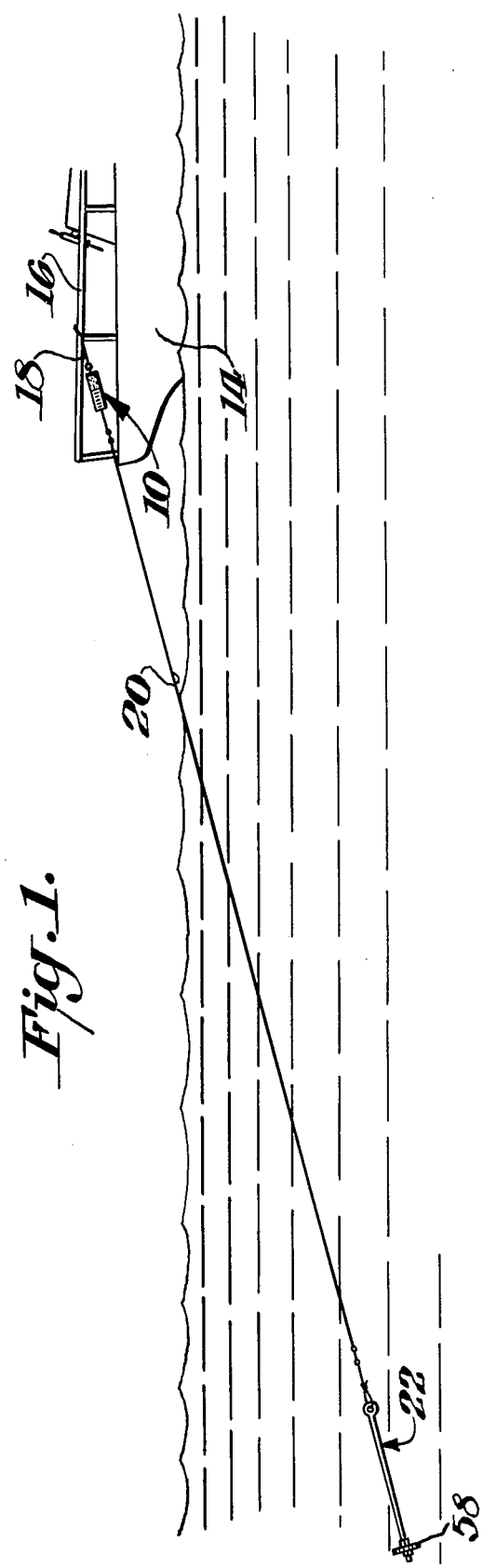
FIG. 1 is a pictorial view of a boat stern showing the knotmeter in use for measuring the speed of a boat.

Referring more particularly to the three figures of the drawings, a knotmeter 10 according to the present invention is shown in FIG. 1 mounted near the stern of a boat 14. The knotmeter 10 is attached to the boat 14 at any convenient place within sight of the boat operator or a crew member. As shown in FIG. 1 a flexible line 18 is attached on one end to a railing 16 and the other end to one end of the knotmeter 10. An elastomeric line 20 which is attached to the other end of the knotmeter 10 trails behind the boat 14 and is attached at its other end to a drag 22. As shown in FIG. 1 the movement of the boat in the water causes the line 20 to be an essentially straight line. This essentially straight line configuration is continued through the knotmeter 10 and the flexible line 18 to the attachment on the rail 16. Naturally, there is some slight sagging from the point of attachment on the rail 16 to the end of the drag 22 due to the weight of the line and the knotmeter.

Figure 2:
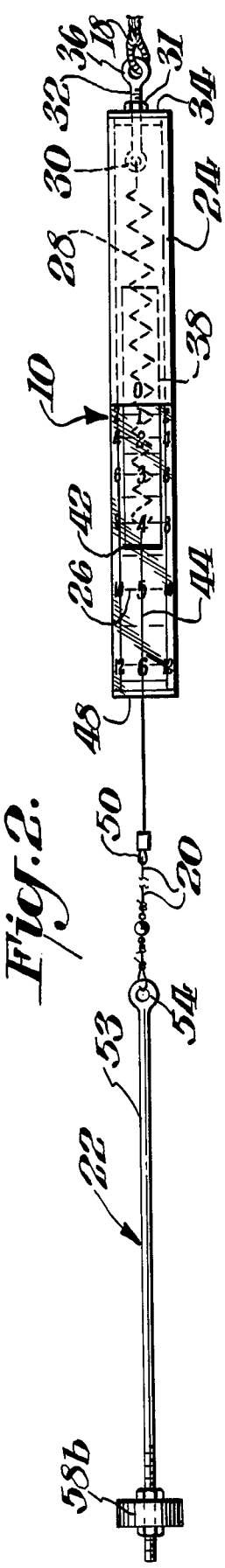
FIG. 2 is a side elevational view of the knotmeter with the upper half of the device shown in phantom and a drag and line used with the knotmeter.
Figure 3:
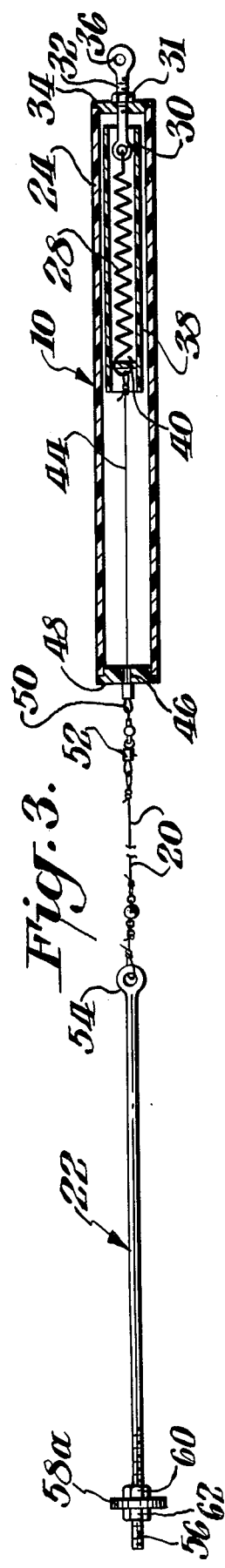
FIG. 3 is another side longitudinal cross sectional view of the knotmeter and another drag unit used with the knotmeter.

FIGS. 2 and 3 show details of the knotmeter 10 and the drag 22 in more detail. The outer cylindrical housing 24 for the knotmeter is preferably transparent in its lower half. A graduated scale 26 is impressed or painted onto the transparent lower half of the outer cylindrical housing. A tension spring 28 is attached to the lower opening 30 in the eyebolt 32 mounted on the cap 34 of the cylindrical housing 24. The eyebolt 32 is held in place by a bolt 31. The outer opening 36 of the eyebolt 32 receives one end of the flexible line 18 which is attached to the boat. The tension spring 28 is housed in an inner cylindrical housing 38 having an open upper end. The lower end of the spring 28 is attached to a bar 40 mounted in the lower end of the inner cylindrical housing 38. The lower edge of the inner cylindrical housing has a black ring 42 painted on it so that as the inner cylindrical housing is pulled down the black ring 42 is seen against the graduated scale 26 on the lower end of the outer cylindrical housing. The lower end of the tension spring 28 is attached to a line 44 which extends through a hole 46 in the lower cap 48. The line 44 is long enough so that a loop 50 in the end of the line 44 is next to the cap 48 when the device is not in use. An elastomeric line 20 is attached to the loop 50 by tying or any other suitable means such as a swivel 52. The other end of the elastomeric line 20 is attached to a drag 22 formed from a stiff rod 53 having an eye 54. Said rod has threads 56 at the other end to secure a disk 58 at the threaded end 56, a disk 58 is held in place by a pair of bolts 60 and 62. As is shown in FIG. 1 and FIG. 2, the disk 58 may be of varying diameter and thickness (58a and 58b) and is centered on the shaft 53 of the drag.

The elastomeric line 20 dampens the effect of any sudden surge of forces acting on the drag and thereby smoothes out the readings on the knotmeter 10. Elastomeric line 20 having the following characteristics will provide the dampening effect desired.

Total stretch of the elastomeric line 20 under the drag force imposed by operation at full scale on the device is from two to twenty feet. The break strength of the line is at least five to ten times the load which causes a full scale reading on the knotmeter. The line is made of materials which adequately resist the sun and salt water enviroment.

The tension spring 28 in the knotmeter 10 is a calibrated spring, and is adjusted by means of the bolt 31 so that the indicator 42 is set at the zero point on the graduated scale 26. The drag 22 is found to be very stable in operation and does not fluctuate vertically or horizontally while being towed. This is in contrast to other drag designs which have been tried. It is essential that the disk 58 be attached to the end of a stiff rod 53 in order to obtain stable performance. A circular disk attached to the end of the elastomeric line would not be as stable as the design discribed herein. The overall length of the drag is from six to twelve inches.

The drag 22 is designed so that the disk 58 may be readily changed to a larger diameter 58b or a smaller diameter 58a. The drag 22 is heavier than water and the disk 58 may be of metal or plastic. The disk 58 is circular and optionally has a diameter ranging from ½ inch (1.25 cm.) to 2 inches (5.08 cm.).

The scale 26 is set up to provide either a full scale reading of 12 knots or 6 knots dependong on the diameter of the disk attached to the rod 53. A full scale reading of 3 knots could also be provided.

In FIG. 2, the scale 26 is shown having two scales superimposed. One ranges from 0 to 6 knots and the other is 6 to 12 knots. Each scale has a different disk associated with it. A smaller diameter disk will obviously be associated with the higher speeds.

I claim:

1. A device for measuring the relative velocity between a boat and water comprising:
   (a) a flexible line from the boat to a
   (b) force-responsive means acting in cooperation with indicating means, and
   (c) an elastomeric line attached on one end to the force responsible means, and
   (d) a heavier-than-water drag attached to the other end of the elastomeric line wherein the drag is a stiff rod with a circular disk at one end, whereby the movement of the boat causes the water to exert force on the drag which is transmitted to the force responsive means thereby measuring the relative speed of the boat.

2. A device as in claim 1 in which the force responsive means is a calibrated tension spring which is attached to the flexible line on one end and the elastomeric line on the other end.

3. A device as in claim 1 wherein the drag is a circular disk attached through its center to a rigid rod which is in turn attached to the elastomeric line.

4. A device as in claim 1 wherein the force responsive means and indicating means is a transparent hollow cylinder case having a graduated scale lengthwise of the periphery of said cylinder and being attached on the upper end to the flexible line from the boat and having a calibrated tension spring inside the cylinder and attached to the inside of the upper end, said spring having an indicator bar on the other end such that the bar marks the location of the end of the spring inside the cylinder and having the elastomeric line attached to the same end of the spring as the indicator bar whereby the force on the drag causes the spring to be stretched thereby moving the indicator bar alongside the graduated scale indicating the speed of the boat.

5. A device as in claim 4 wherein the calibrated tension spring is enclosed inside of and attached to the lower closed end of a second cylinder whose outer diameter is slightly smaller than the inner diameter of the cylinder case whereby a pressure differential is generated between the cylinder case and the second cylinder in response to the pull or release of the drag.

* * * * *